United States Patent
Yu

(10) Patent No.: US 7,180,608 B1
(45) Date of Patent: Feb. 20, 2007

(54) SIGNATURE LAYOUT FOR COMPUTER PRINTERS

(75) Inventor: Zhongming Yu, Redwood City, CA (US)

(73) Assignee: Riooh Company, Ltd., Tokyo (JP)

( * ) Notice: Subject to any disclaimer, the term of this patent is extended or adjusted under 35 U.S.C. 154(b) by 861 days.

(21) Appl. No.: 09/967,722

(22) Filed: Sep. 28, 2001

(51) Int. Cl.
G06F 15/00 (2006.01)

(52) U.S. Cl. ............... 358/1.1; 358/1.18; 715/517; 715/525; 715/530

(58) Field of Classification Search ............... 358/1.1; 715/525, 530
See application file for complete search history.

(56) References Cited

U.S. PATENT DOCUMENTS

| | | | | |
|---|---|---|---|---|
| 5,057,869 A | * | 10/1991 | Graves et al. | 358/486 |
| 5,105,283 A | * | 4/1992 | Forest et al. | 358/401 |
| 5,126,858 A | * | 6/1992 | Kurogane et al. | 358/450 |
| 5,271,065 A | | 12/1993 | Rourke et al. | 382/1 |
| 5,398,289 A | | 3/1995 | Rourke et al. | 382/1 |
| 5,607,145 A | * | 3/1997 | Lovell | 270/1.01 |
| 5,732,403 A | * | 3/1998 | Nakamura | 715/514 |
| 5,903,903 A | * | 5/1999 | Kennedy | 715/525 |
| 5,911,146 A | * | 6/1999 | Johari et al. | 715/525 |
| 6,046,818 A | * | 4/2000 | Benson | 358/1.18 |
| 6,088,710 A | * | 7/2000 | Dreyer et al. | 715/517 |
| 6,169,544 B1 | * | 1/2001 | Onoda | 715/723 |
| 6,307,637 B1 | * | 10/2001 | Kujirai | 358/1.11 |
| 6,509,977 B1 | * | 1/2003 | Kujirai et al. | 358/1.18 |
| 6,826,727 B1 | * | 11/2004 | Mohr et al. | 715/517 |
| 6,961,708 B1 | * | 11/2005 | Bierenbaum | 705/8 |
| 2001/0039554 A1 | * | 11/2001 | Iwasaki | 707/525 |
| 2001/0051964 A1 | * | 12/2001 | Warmus et al. | 707/530 |
| 2002/0016799 A1 | * | 2/2002 | Nakagiri et al. | 707/517 |

* cited by examiner

*Primary Examiner*—Twyler Lamb
*Assistant Examiner*—Mark R. Milia
(74) *Attorney, Agent, or Firm*—Hickman Palermo Truong Becker LLP

(57) ABSTRACT

A method and apparatus is provided for printing an electronic document by automatically printing more than two pages from the electronic document on each side of a sheet of output. The pages that are printed on each sheet of output are automatically arranged in such a manner that when the sheets of output are folded, the pages appear in the correct numerical order. The sheets of output are automatically folded. The edges of the folded sheets of output are automatically trimmed, and the sheets of output are automatically bound together along one edge to form a book.

51 Claims, 12 Drawing Sheets

SIGNATURE LAYOUT FOR COMPUTER PRINTERS

FIELD OF THE INVENTION

The invention relates generally to printers and more specifically, to printing signatures using computer printers.

BACKGROUND OF THE INVENTION

In commercial print shops, multiple pages of a book can be printed on one side of a sheet of output. However, the printing operation is performed manually. The image of each page is placed manually ("manual layout") in a certain order prior to printing the sheet of output. When the sheets of output are folded and trimmed, a book is produced with the pages of the book in a correct numerical order.

In the context of printing electronic documents using computers and computer printers, the pages of an electronic document are automatically printed on print media ("sheets of output") using either a "sequential layout" or a "booklet layout". In a sequential layout for printing, each page of a given electronic document is automatically printed on one side of a sheet of output. Thus, a single sheet of output has, at most, two pages of the electronic document printed on the sheet of output, with one page on each side of the output sheet. In a booklet layout for printing, not more than two pages of the electronic document are automatically printed on one side of a sheet of output. Thus, in the context of printing electronic documents using computers, no more than two pages of an electronic document are automatically printed on one side of a sheet of output.

For the purpose of explanation, FIG. 1 is a block diagram that illustrates a system that prints sheets of output using a sequential layout for printing. In FIG. 1, computer 100 is coupled by a data connection 115 to a printer 108. The term "computer" with reference to computer 100 is used in a broad sense to refer to any device that is capable of generating output to an output device. For example, computer 100 may be a mainframe computer, workstation, personal computer, or other device with a processing unit. Similarly, the term "printer" with reference to printer 108 is used in a broad sense to refer to any printer device. Printer 108 may be a laser printer, impact printer, image printer, or other printer device.

Connection 115 may be any data connection between computer 100 and printer 108. For example, connection 115 can be a cable coupled from computer 100 to printer 108, or a wireless data transmission channel. Alternatively, connection 115 is a local area network, internetwork, or Internet connection.

Computer 100 operates under the control of an operating system 102, such as UNIX, Mac OS, or Windows®. An application program 106 runs under the control of operating system 102. Application program 106 may be, for example, a word processor that generates electronic documents or opens existing electronic documents for printing on printer 108. Other examples of application programs 106 include spreadsheet programs, graphics programs, financial applications, etc.

Device driver 104 controls communications of operating system 102 to printer 108. Generally, computer programs called "device drivers" control computer devices such as output devices, disk drives or input devices. The device driver is used as an intermediary to translate communications from other computer programs into a language that the device can understand. The use of a device driver facilitates device independence. For example, when application program 106 is a word processing program, the word processing program cannot directly instruct printer 108 on how to print a particular page from the electronic document. Instead, the word processing program instructs the operating system to send the page that is to be printed to printer 108. Operating system 102 forwards the page to device driver 104. Device driver 104 converts the page into a format that printer 108 can understand.

Device drivers normally generate output in a printer-specific manner. For example, an output device such as a computer printer can only understand instructions written in a specialized language such as a Page Description Language ("PDL"). The term PDL refers to a class of source languages that are used for describing the layout and content of a printed page, and to control computer printers. There are several PDLs, such as PostScript and Hewlett-Packard's Printer Control Language ("PCL").

For the purpose of explanation, assume a user uses application program 106 to access an electronic document. Further assume that the user invokes a print command to print eight pages from the electronic document using a sequential layout for printing. Operating system 102 forwards the eight pages of the electronic document to device driver 104. Device driver converts the eight pages of the electronic document into a format that can be understood by printer 108.

As a result, as shown FIG. 1, printer 108 prints out the eight pages of the electronic document on four sheets of output 120, 122, 124 and 126 using a sequential layout for printing. Each side of each of the four sheets of output has one of the eight pages from the electronic document printed on it. For example, on the front side of the sheet of output 120, the first page of the electronic document is printed and marked as page "1" as shown by the pagination indicator 118. On the other side of the sheet of output 120, the second page of the electronic document is printed and marked as page "2" as shown by the pagination indicator 116. An example of appropriate print media for the four sheets of output 120, 122, 1124, and 126 is printer paper.

FIG. 2 is a block diagram that illustrates a system that prints sheets of output using a booklet layout for printing. In FIG. 2 a user uses application program 106 to access an electronic document. Assume that the user invokes a print command to print twelve pages from the electronic document using a booklet layout for printing. Operating system 102 forwards the twelve pages of the electronic document to device driver 104. Device driver converts the twelve pages of the electronic document into a format that can be understood by printer 108.

As a result, as shown in FIG. 2, printer 108 prints out the twelve pages of the electronic document on three sheets of output 208, 210, and 212 using the booklet layout for printing. Each side of each of the three sheets of output has printed on it, two pages of the twelve pages of the electronic document. For example, on the front side of sheet of output 208 is printed the second and eleventh pages of the electronic document. The second and eleventh pages are marked as pages "2" and "11" as shown by pagination indicators 216 and 218, respectively. Sheet of output 208 has a folding line 222 to separate the second page from the eleventh page. On the flip side of sheet of output 208 is printed the first and twelfth pages of the electronic document. The first and twelfth pages are marked as pages "1" and "12" as shown by pagination indicators 214 and 220, respectively.

Sheets of output 210 and 212 also have folding lines 224 and 226, respectively. Sheets of output 208, 210 and 212 are folded along their respective folding lines to form a booklet of twelve pages. The folded sheets of output are nested so that sheet of output 208 is the outermost sheet and sheet of output 210 is sandwiched between sheet of output 208 and 212. Thus, the pages of the booklet have the correct numerical order.

Based on the foregoing, there is a clear need for a method to automatically print a plurality of sheets of output that have more than two pages on each side of a given sheet of output of the plurality of sheets of output. There is a further need for an approach for automatically printing a plurality of sheets of output that have more than two pages on each side of a given sheet of output of the plurality of sheets of output, wherein the pages are separated by folding lines such that when the plurality of sheets of output are folded to form a book, the pages of the book are in the correct numerical order.

SUMMARY OF THE INVENTION

According to one aspect of the invention, an electronic document is printed by automatically printing more than two pages from the electronic document on each side of a sheet of output. The pages that are printed on each sheet of output are automatically arranged in such a manner that when the sheets of output are folded, the pages appear in the correct sequential order.

According to another aspect of the invention, the sheets of output are automatically folded. The edges of the folded sheets of output are automatically trimmed and the sheets of output are automatically bound together along one edge to form a book.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

A method and apparatus for printing signatures using a computer printer is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The description is presented according to the following general outline:

| | |
|---|---|
| 1.0 | SIGNATURE DESIGN |
| 2.0 | FUNCTIONAL OVERVIEW |
| 3.0 | SIGNATURE LAYOUT SETTINGS |
| 4.0 | USER SIGNATURE DEFINITION FILES |
| 5.0 | PAGINATION DETERMINATION |
| 6.0 | SIGNATURE PAGINATION FILTER |
| 7.0 | IMPLEMENTATION MECHANISMS |
| 8.0 | EXTENSIONS AND ALTERNATIVES |

1.0 Signature Design

In the context of printing an electronic document, a signature is defined herein as a set of one or more sheets of output, wherein on each side of each sheet of output of the signature is printed more than two pages of the electronic document. Further, for any given sheet of output in a signature, the pages on each side of the sheet of output are separated from each other by folding lines. Also, for any given sheet of output in a signature, the pages on each side of the sheet of output are arranged in such a manner so that when the signature is folded along the folding lines and is trimmed, the folded signature has pages in the correct numerical order. Typically, a book is formed by a single folded signature or by collating and binding together several folded signatures.

Figure 1:
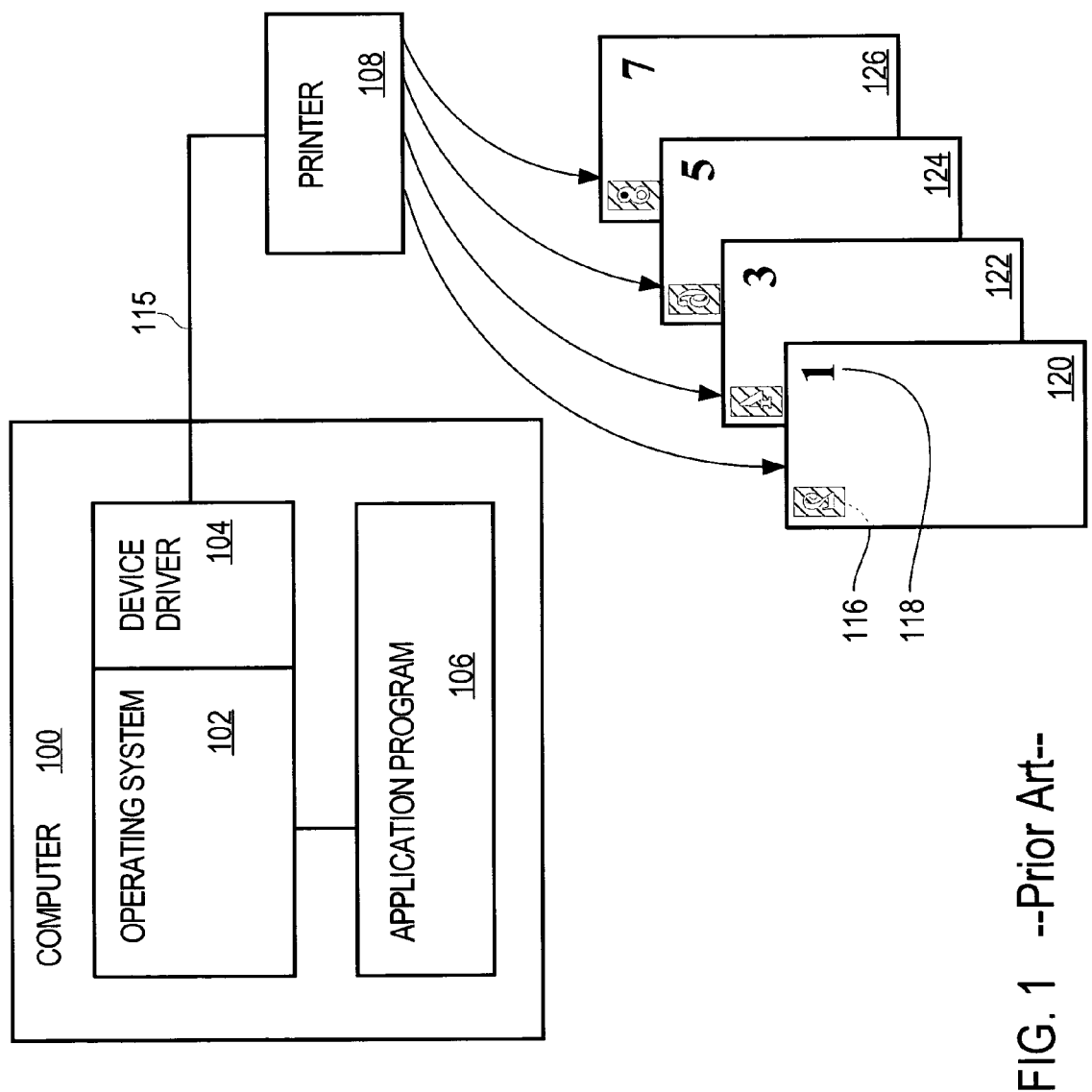
FIG. 1 is a block diagram that illustrates a system that prints sheets of output using a sequential layout for printing.
Figure 2:
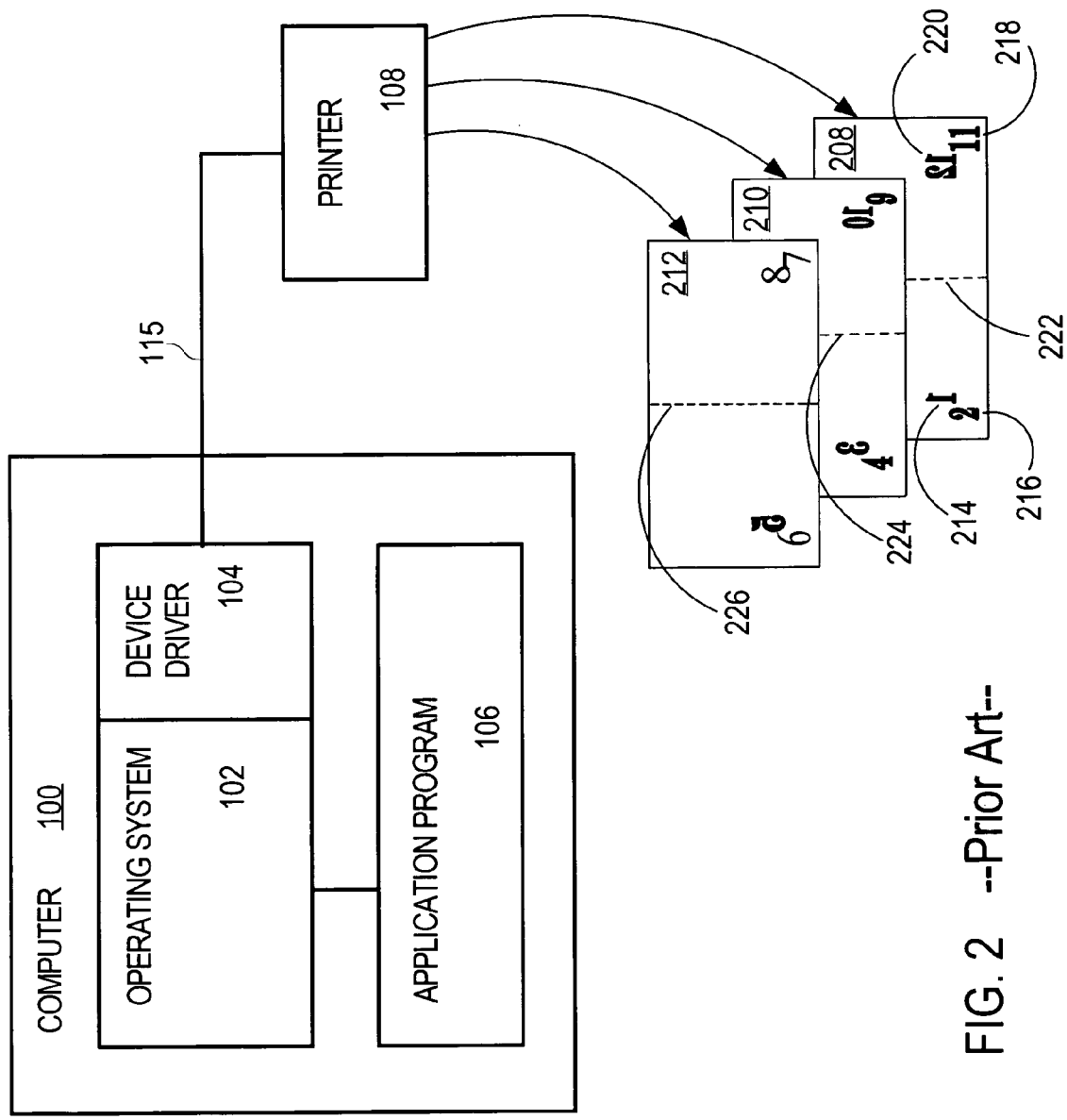
FIG. 2 is a block diagram that illustrates a system that prints sheets of output using a booklet layout for printing.
Figure 3:
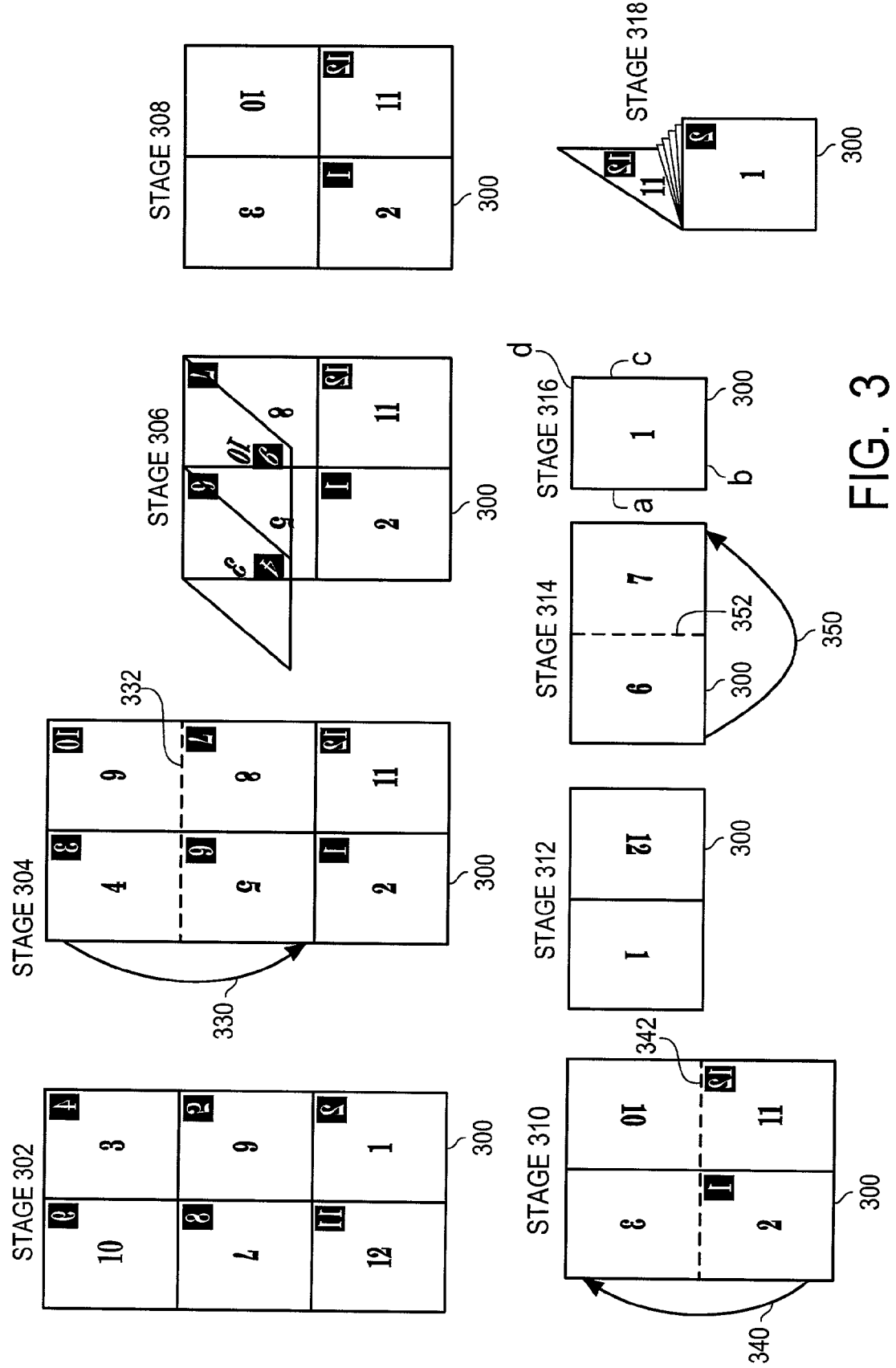
FIG. 3 is a block diagram that illustrates the folding operation of a sample signature.

FIG. 3 is a block diagram that illustrates the folding operation of a sample signature. For the purpose of explanation, in FIG. 3, signature 300 consists of a single sheet of output. FIG. 3 illustrates the various stages in the folding operation of signature 300. In FIG. 3, stage 302 shows signature 300 prior to being folded. Stage 304 shows how signature 300 is to be folded along fold line 332 in the direction indicated by arrow 330. This is the first fold. Stage 306 shows signature 300 being folded in the manner that is illustrated at stage 304. Stage 308 shows signature 300 upon completion of the first fold. Stage 310 shows how signature 300 is to be folded along fold line 342 in the direction indicated by arrow 340. This is the second fold. Stage 312 shows signature 300 upon completion of the second fold. Stage 314 shows the flip side of signature 300 upon completion of the second folding. In addition, stage 314 shows how signature 300 is to be folded along fold line 352 in the direction indicated by arrow 350. This is the third fold. Upon completion of the third fold, stage 316 shows signature 300 with sides "a", "b", "c", and "d". At stage 318, signature 300 is trimmed along sides "b" and "d" in order to separate the pages of signature 300. Signature 300 now resembles a book with pages in the correct numerical order. Side "a" is the spine edge of the book and can be stapled, stitched or glued in order to secure the pages of the book.

If the number of pages from the electronic document that is to be printed is known and if a user 1) specifies the number of pages ("sheet parameter") to be printed on each side of a sheet of output and 2) specifies the number of sheets of output that comprises a signature, then the short form of the signature design is denoted as X_Y_S_P and is defined as follows:

F=quotient [P/(S*2*X*Y)]
r=P−(F*S*2*X*Y) or r=P modulus (S*2*X*Y)
t=E[r/(2*X*Y)] for r>0
wherein:
F represents the number of full signatures. A full signature is a signature that comprises the exact number of sheets of output as specified by the user. On each side of each sheet of output in a full signature is printed X*Y number of pages from the electronic document to be printed.
Quotient [m/n] is defined as the integer quotient of the result of dividing m by n.
S represents the total number of sheets of output that comprises a signature as specified by the user.
X represents the number of pages to be printed along the x axis of a sheet of output.
Y represents the number of pages to be printed along the y axis of a sheet of output. Thus, the sheet parameter is the product of X and Y.
P represents the total number of pages from the electronic document that is to be printed. Thus, P may be all the pages in the entire electronic document or selected pages that are selected for printing.
r is the residue of dividing P by (S*2*X*Y). Thus, r is the residual number of pages left to be printed after printing F full signatures.
E[m/n] is defined as taking the nearest integer value of the result of dividing m by n, wherein the nearest integer value is ≧(m/n) for all m>0. Thus, if R represents a partial signature, wherein a partial signature is defined as a signature that does not contain the full number of sheets of output as specified by the user, then t is the number of sheets of output in R.

To illustrate, for a signature design specified as 2_3_4_322, then
F=quotient [322/(4*2*2*3)]=6
r=322−(6*4*2*2*3)=34
t=E[34/(2*2*3)]−=E[2.83]=3

Thus, the signature in the above example has 6 full signatures with four sheets of output and one partial signature comprising of three sheets of output. Of the three sheets of output of the partial signature, the last sheet of output contains two blank pages because the residual number of pages is thirty four.

2.0 Functional Overview

Figure 4:
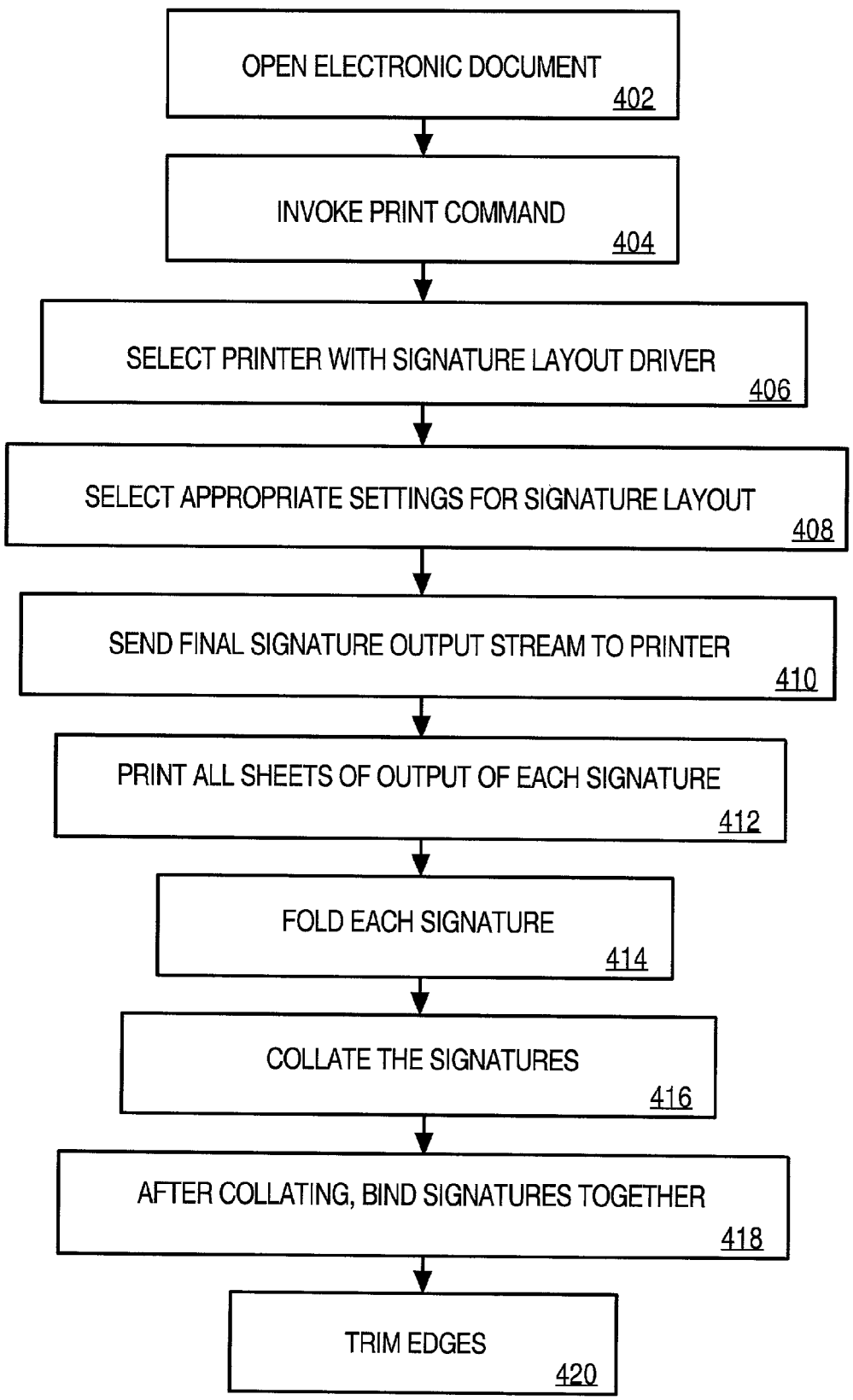
FIG. 4 is a flowchart that illustrates a functional overview of certain embodiments of the invention.

FIG. 4 is a flowchart that illustrates a functional overview of certain embodiments of the invention. At block 402, the electronic document that is to be printed is opened. For example, application program 106 may be used to open the electronic document that is to be printed. The pages of the entire electronic document or selected pages of the electronic document may be printed by invoking the print command, at block 404, of application program 106.

At block 406, the printer that is equipped with a driver for handling signature layouts is selected. For example, assuming that device driver 104 handles signature layouts then printer 108 is selected.

At block 408, the appropriate settings for signature layout are selected. For example, for the signature design 2_3_2_322, six pages per side (2 by 3) of each sheet of output are selected and the number of sheets of output per signature is selected as 2. Sample displays of a graphical user interface for selecting settings for signature layout are described in greater detail with reference to FIG. 6A, FIG. 6B, FIG. 6C, and FIG. 6D herein.

A final signature output stream is generated based on the selected settings for the signature layout. The operation of generating the final signature output stream is described in greater detail herein with reference to FIG. 5 and FIG. 7A and FIG. 7B.

At block 410, the final signature output stream is sent to the printer. In the example herein, final signature output stream is sent to printer 108. At block 412, all sheets of output of each signature are printed. At block 414, each signature is folded. In certain embodiments, for X=2, and Y=3, each signature is folded in the manner described with reference to FIG. 3. In certain embodiments, the signatures are automatically folded by the printer that is equipped with a folding mechanism.

At block 416, the signatures are automatically collated by the printer. At block 418, the collated signatures are bound together. In certain embodiments, the collated signatures are automatically bound together by the printer that is equipped with a binding mechanism for binding the signatures along the spine edge "a" as illustrated in FIG. 3. At block 420, edges "b", "c" and "d" are trimmed in order to separate the pages of the signatures. In certain embodiments, the printer is equipped with a trimming mechanism for automatically trimming the edges of the signatures.

3.0 Signature Layout Settings

Figure 5:
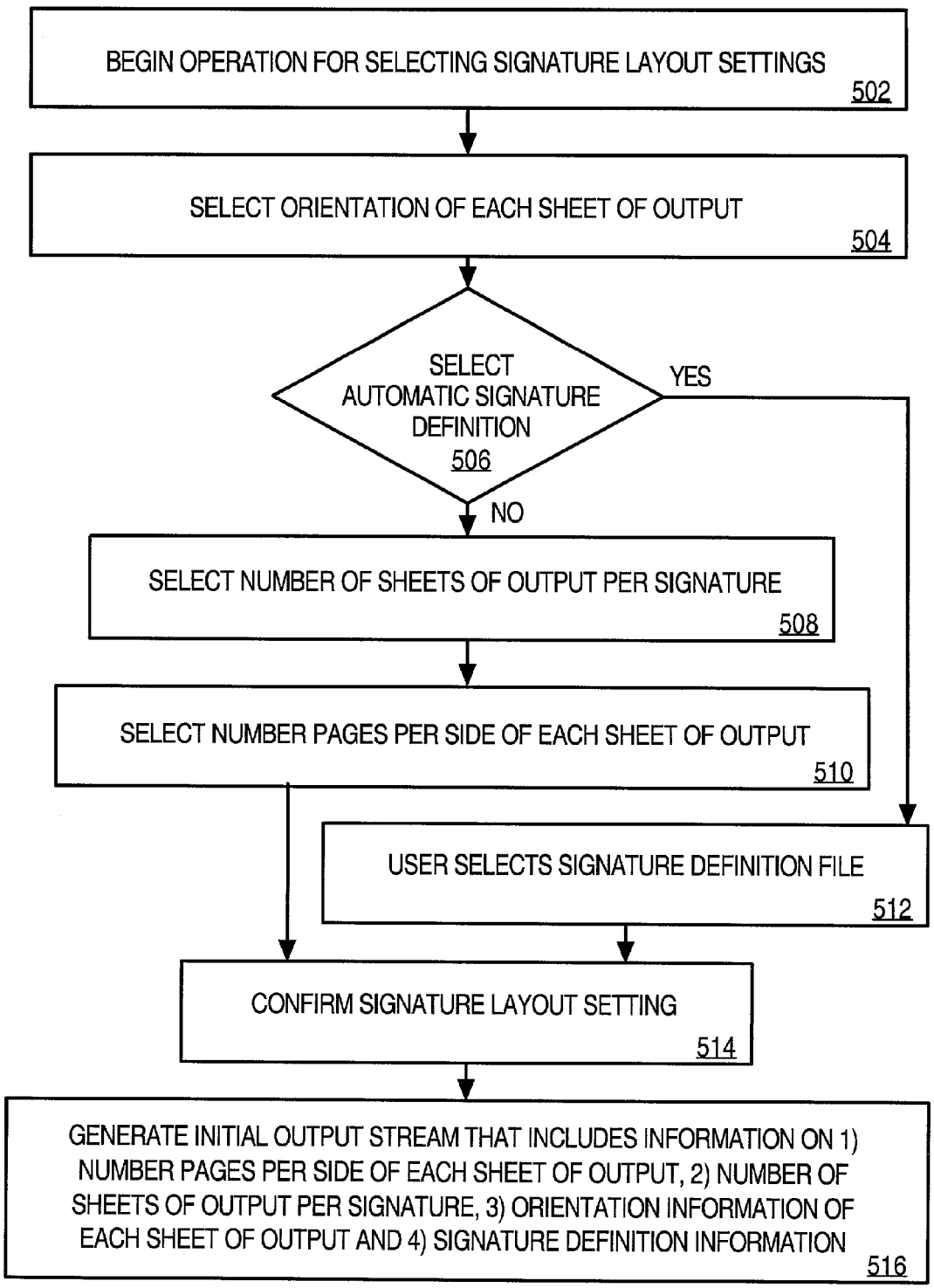
FIG. 5 is a flowchart that illustrates the operation for selecting signature layout settings.

FIG. 5 is a flowchart that illustrates the operation for selecting signature layout settings. FIG. 5 is described with reference to FIG. 6A, FIG. 6B, FIG. 6C, and FIG. 6D herein. FIG. 6A, FIG. 6B, FIG. 6C, and FIG. 6D are sample displays of a graphical user interface that illustrate signature layout settings.

At block 502, the operation for selecting signature layout setting is begun. For example, when a user invokes the print command, a dialog box of a graphical user interface such as the one illustrated in FIG. 6A is displayed on a computer screen of computer 100.

Figure 6A:
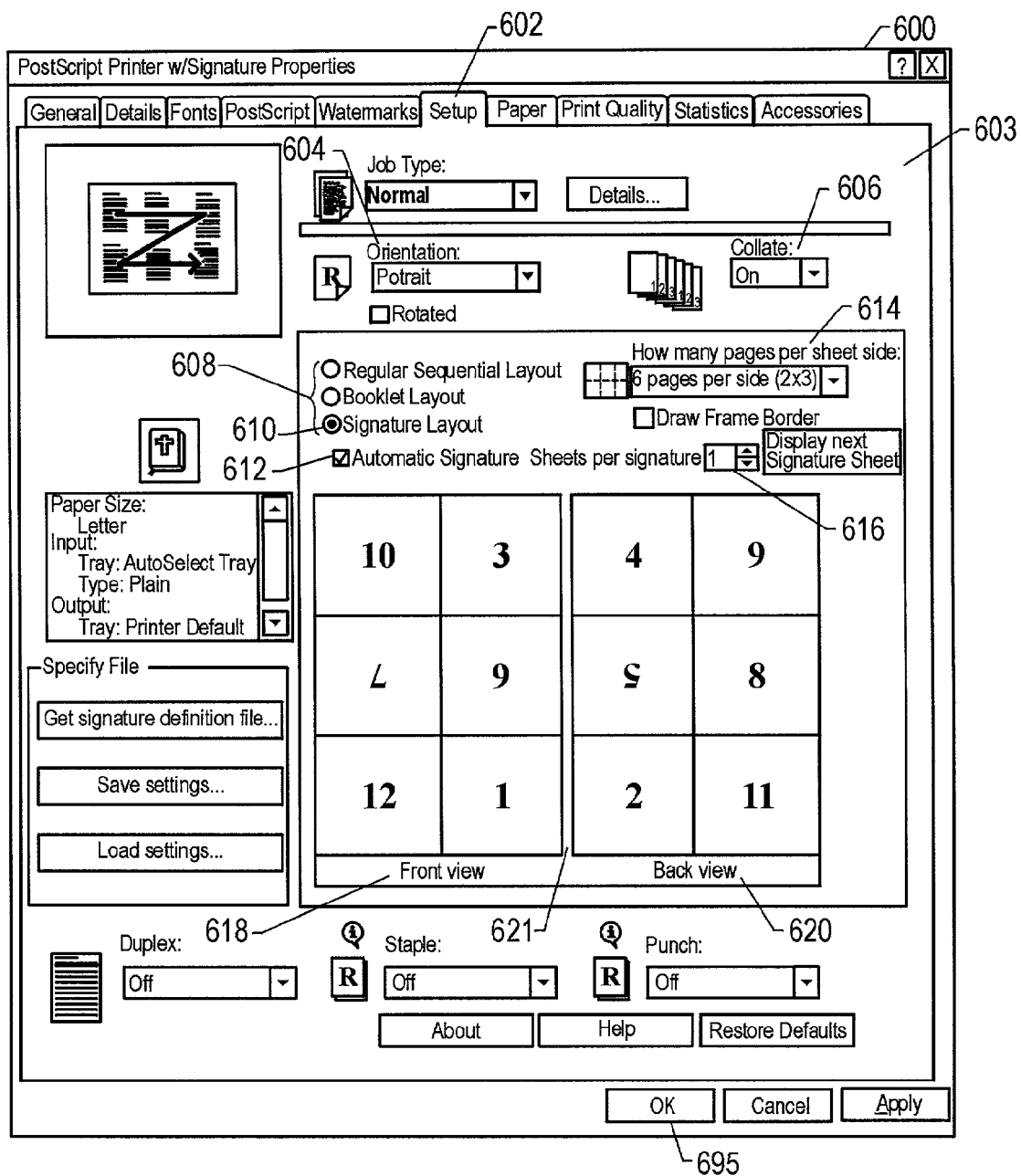
FIG. 6A, FIG. 6B, FIG. 6C, and FIG. 6D are sample displays of a graphical user interface that illustrate signature layout settings.

In FIG. 6A, dialog box 600 requests information from the user. For example, when the user is presented with dialog box 600, the user can select the setup tab 602 in order to select the settings for the signature layout. When setup tab 602 is selected, screen 603 is displayed. Screen 603 displays various buttons, subpanels, fields and other elements that allow the user to select general printing parameters and settings for the signature layout.

At block 504 of FIG. 5, the orientation of each sheet of output is selected. Screen 603 of FIG. 6A displays an orientation subpanel 604. For example, the user may select either a "portrait" orientation or a "landscape" orientation for printing. Among other things, screen 603 displays a collate option subpanel 606, output sheet layout options 608, an automatic signature definition option 612, a number of pages subpanel 614, a number of sheets of output per signature subpanel 616.

In certain embodiments, at block 506, it is determined whether an automatic signature definition option 612 is to be selected. If it is determined that the automatic signature definition option 612 is to be selected and that the user actually selects the automatic signature definition option 612, then at block 508, the number of sheets of output per signature is selected and at block 510, the number of pages per side of each sheet of output is selected.

When automatic signature definition option 612 is selected, printer driver 104 automatically fetches an appropriate pre-determined signature definition file based on all the user's selections as shown on screen 603. Different pre-determined signature definition files are used depending on the user's selections on screen 603. In certain embodiments, printer driver 104 has automatic access to a set of pre-determined signature definition files. Thus, when automatic signature definition option 612 is selected, the operation of fetching the appropriate pre-determined signature definition file based on all the user's selections as shown on screen 603 is transparent to the user.

If it is determined that the automatic signature definition option 612 will not be selected, then at block 512 the user has the option of selecting his own signature definition file from a source to which the printer driver has no automatic access. The operation by which the user selects his own signature definition file from a source to which the printer driver has no automatic access is explained in greater detail with reference to FIG. 6D.

For the purpose of explanation and with reference to FIG. 6A, assume that the user selects the following: 1) signature layout option 610 from the group of output sheet layout options 608, 2) six pages per side in number of pages subpanel 614, 3) one sheet of output in number of sheets of output per signature subpanel 616. In certain embodiments, when signature layout option 610, the collate option as shown in collate option subpanel 606 is automatically turned on.

At block 514, the signature layout settings are confirmed by the user. Layout subpanel 621 is a visual aid to help the user confirm the signature layout settings. To confirm the signature layout settings, the user can select the "OK" button 695 of dialog box 600.

In the above example, the user selected one sheet of output in number of sheets of output per signature subpanel 616. Thus, layout subpanel 621 displays a front view 618 and a back view 620 of the single sheet of output of the first signature. The display in layout subpanel 621 is based on the pre-determined signature definition file that printer driver 104 automatically uses. For every sheet of output in each signature, the pre-determined signature definition file contains information for the arrangement of pages from the electronic document to be printed.

The pages on each side of the sheet of output are arranged in such a manner so that when the signature is folded along the folding lines, the folded signature has pages in the correct numerical order. In the example, front view 618 and back view 620 show the arrangement of the first twelve pages from the electronic document to be printed on the first sheet of output of the first signature. For example, front view 618 shows what pages are to be printed on the front side of the sheet of output. Going from left to right and starting from the bottom left hand corner of the front side of the first sheet of output, front view 618 shows that the pages are printed in the following order: pages 12, 1, 7, 6, 10, and 3. Further, front view 618 shows that pages 7 and 6 are to be printed upside down relative to pages 12, 1, 10, and 3.

If there is more than one sheet of output per signature, the arrangement of the pages on subsequent sheet of output can be displayed as described with reference to FIG. 6B and FIG. 6C.

Figure 6B:
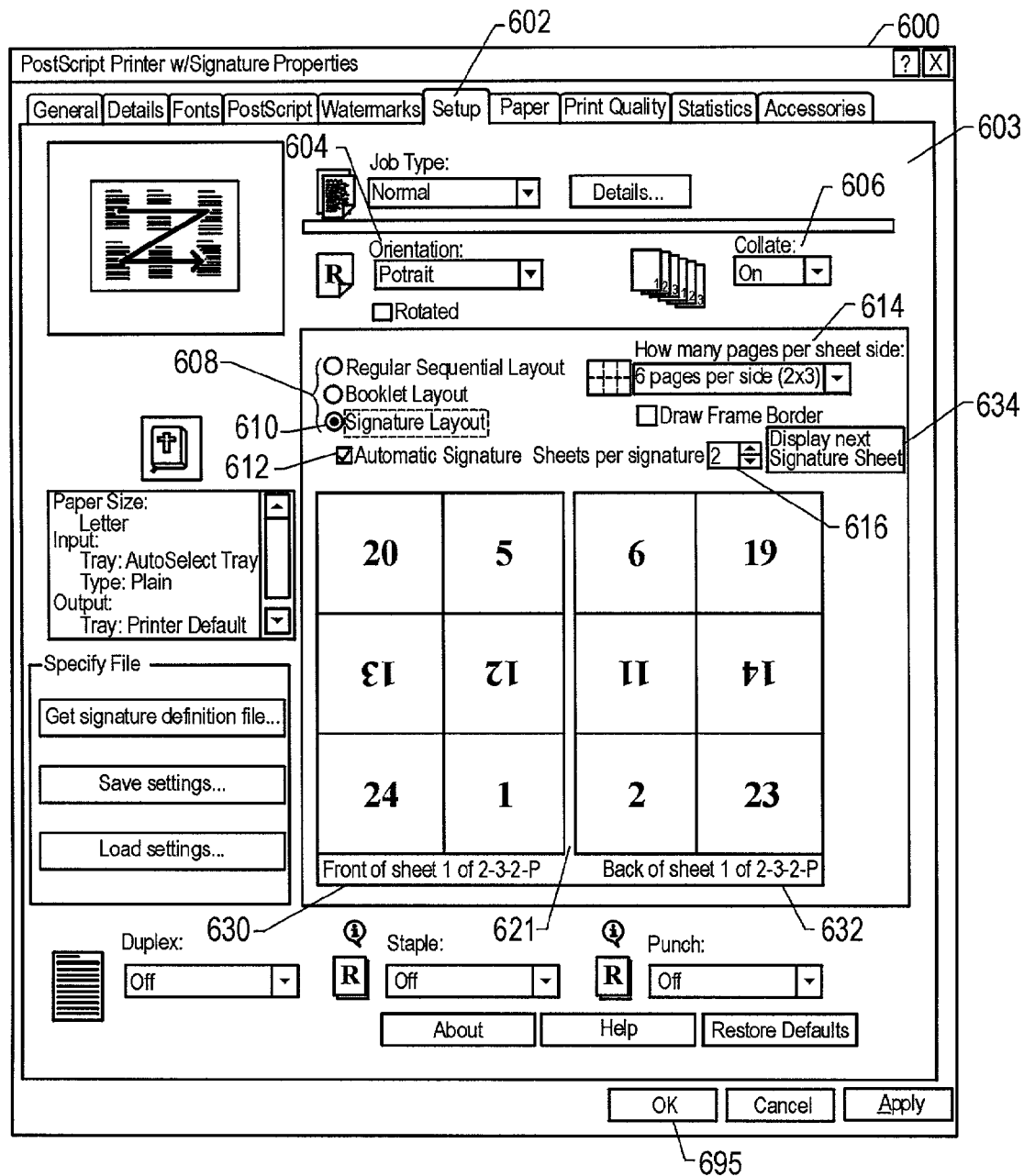

FIG. 6B illustrates a dialog box that is similar to FIG. 6A. However, in the number of sheets of output per signature subpanel 616, it is shown that the number of sheets of output per signature is selected as 2. Front view 630 and back view 632 show the arrangement of pages from the electronic document to be printed on the first sheet of output of the first signature. Further, since each signature has more than one sheet of output, the user has the option of selecting button 634 for displaying the next sheet of output in the signature. If the user selects button 634, then the second sheet of output of the signature will be displayed on screen 603. FIG. 6C illustrates a dialog box that is similar to FIG. 6B. However, front view 640 and back view 642 show the arrangement of pages from the electronic document to be printed on the second sheet of output in the signature.

At block 516 of FIG. 5, the initial output stream is generated. The initial output stream includes information 1) number pages per side of each sheet of output, 2) number of sheets of output per signature, 3) orientation information of each sheet of output and 4) signature definition information. The manner in which the initial output stream is used is explained herein with reference to FIG. 7A and FIG. 7B.

4.0 User Signature Definition Files

Figure 6C:
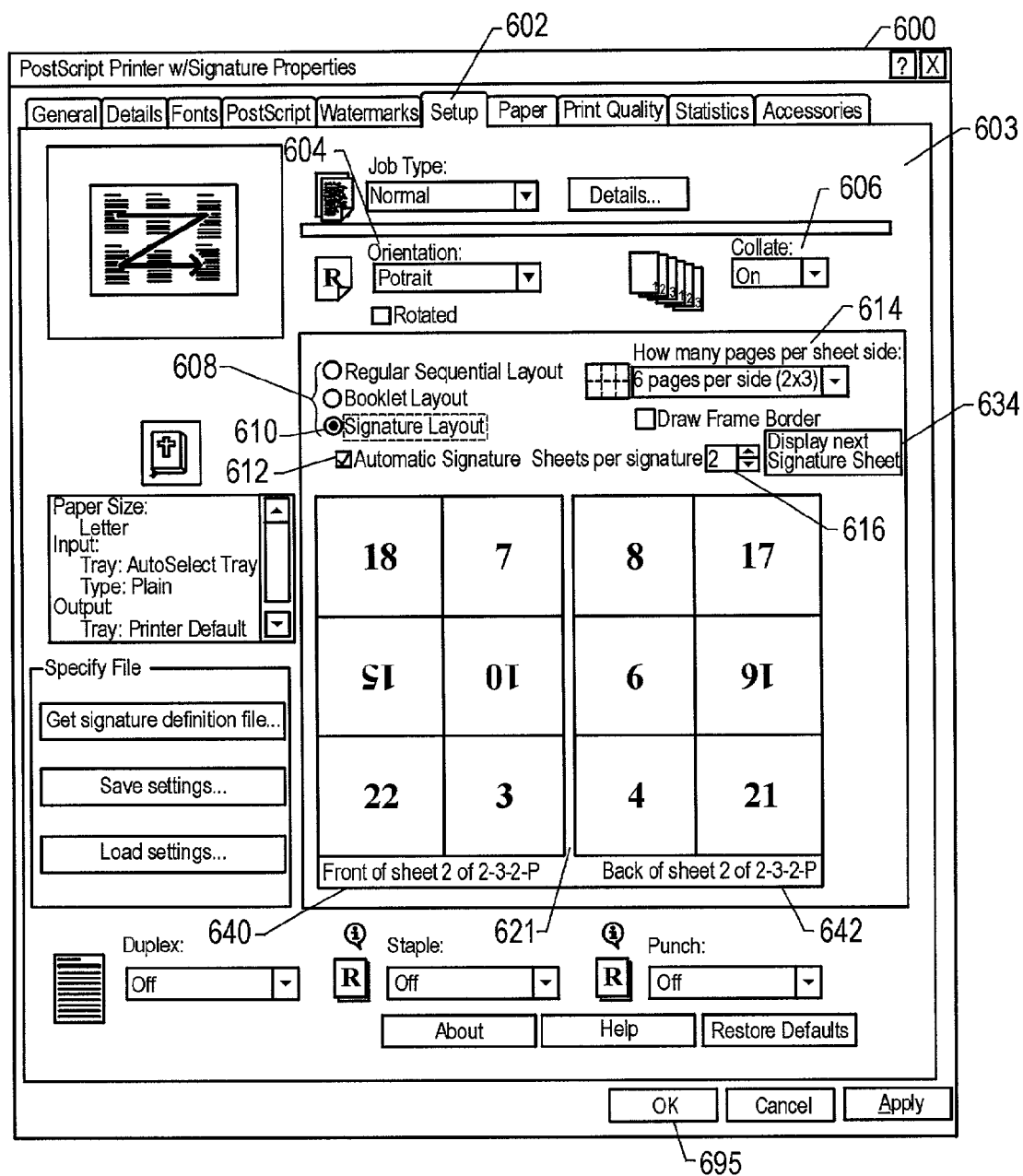
Figure 6D:
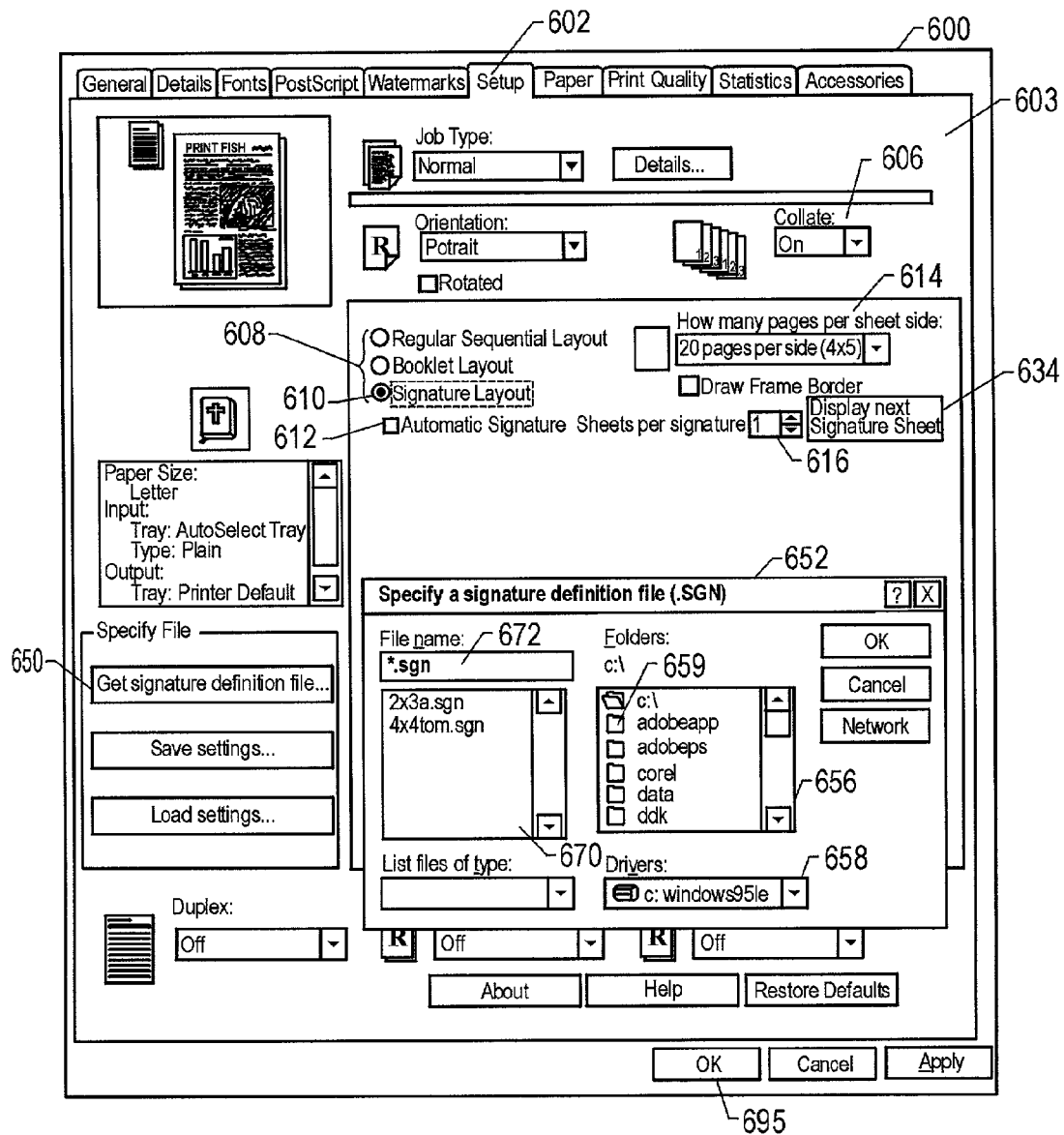

FIG. 6D is similar to FIG. 6A, FIG. 6B, and FIG. 6C. However, in FIG. 6D, automatic signature definition option 612 is not selected. When automatic signature definition option 612 is not selected, the user has the option of selecting the Get Signature Definition File button 650. When the Get Signature Definition File button 650 is selected, then sub-dialog box 652 is displayed on screen 603. Sub-dialog box 652 gives the user the option of selecting his own signature definition file from a source to which the printer driver has no automatic access. Sub-dialog box 652 displays a directory tree subpanel 656, a drive selection subpanel 658, a file list subpanel 670 and a file name subpanel 672.

To illustrate, if the user had previously stored signature definition files that he has created in the C drive of computer 100, then the user can use drive selection subpanel 658 to select the C drive of computer 100. When drive C is selected, directory tree subpanel 656 displays the folders in drive C. Assume that the user had previously stored signature definition files in folder 659. If the user selects folder 659, then file list subpanel 670 displays the user's list of signature definition files. The user can then select one of the signature definition files from the list of signature definition files in file list subpanel 670 by typing, in file name subpanel 672, the file name of the selected signature definition file.

5.0 Pagination Determination

If the arrangement of the pages on each sheet of output of the first signature is known, then the arrangement of the pages on any sheet of output of subsequent signatures can be determined as follows:

$f_{x,y}$ of Nth signature=$f_{x,y}$ of the $1^{st}$ signature+(N−1)*(S*2*X*Y)

$b_{x,y}$ of Nth signature=$b_{x,y}$ of the $1^{st}$ signature+(N−1)*(S*2*X*Y)

wherein:

S represents the total number of sheets of output that comprises a signature as specified by the user.

X represents the number of pages to be printed along the x-axis of a sheet of output.

Y represents the number of pages to be printed along the y-axis of a sheet of output. Thus, the sheet parameter is the product of X and Y.

$f_{x,y}$ is a page on the front view of a sheet of output, where x $\epsilon$ {1, 2, ..., X} and y $\epsilon$ {1, 2, ..., Y}

$b_{x,y}$ is a page on the back view of a sheet of output, where x $\epsilon$ {1, 2, ..., X} and y $\epsilon$ {1, 2, ..., Y}

N is a member of the set of ordered signatures that is to be printed.

To illustrate, in FIG. 6B, front view 630 shows what pages are to be printed on the front side of the first sheet of output of the first signature. Going from left to right and starting from the bottom left hand corner of the front side of the first sheet of output, front view 618 shows that the pages $f_{1,1}$=24, $f_{2,1}$=1, $f_{1,2}$=13, $f_{2,2}$=12, $f_{1,3}$=20, and $f_{2,3}$=5. Similarly, going from left to right and starting from the bottom left hand corner of the flip side of the first sheet of output, back view 632 shows that the pages $b_{1,1}=2$, $b_{2,1}=23$, $b_{1,2}=11$, $b_{2,2}=14$, $b_{1,3}=6$, and $b_{2,3}=19$.

If for example, the page number of $f_{1,3}$ of the $3^{rd}$ signature is to be determined and assuming that then, $f_{1,3}$ of the 2nd signature=$f_{1,3}$ of the $1^{st}$ signature+(N−1)*(S*2*X*Y)=20+(2−1)*(2*2*2*3)

Thus, $f_{1,3}$ of the 2nd signature=44

6.0 Signature Pagination Filter

Figure 7A:
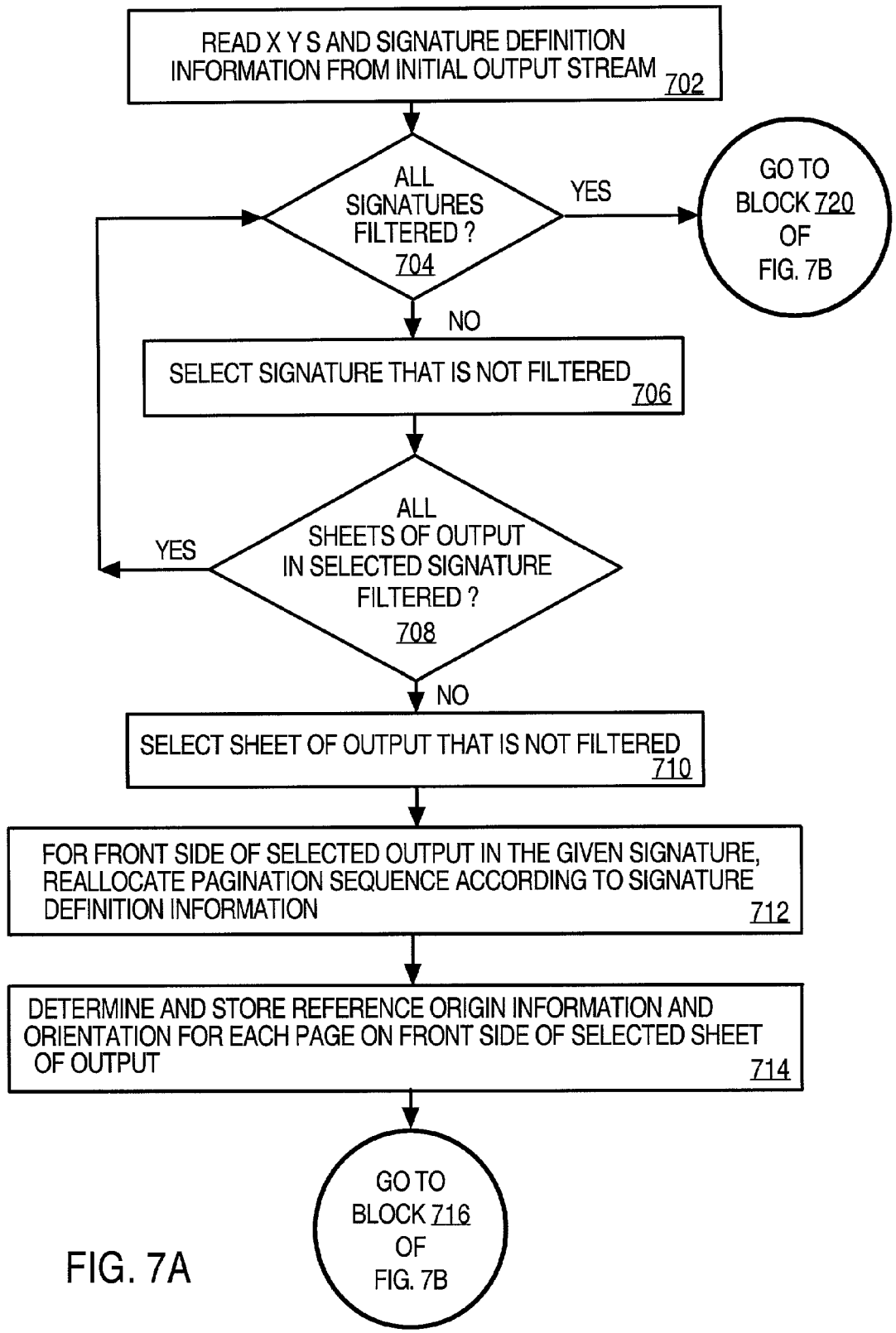
FIGS. 7A and 7B are flowcharts that illustrate the filtering operation performed by the printer driver to produce a final signature output stream.
Figure 7B:
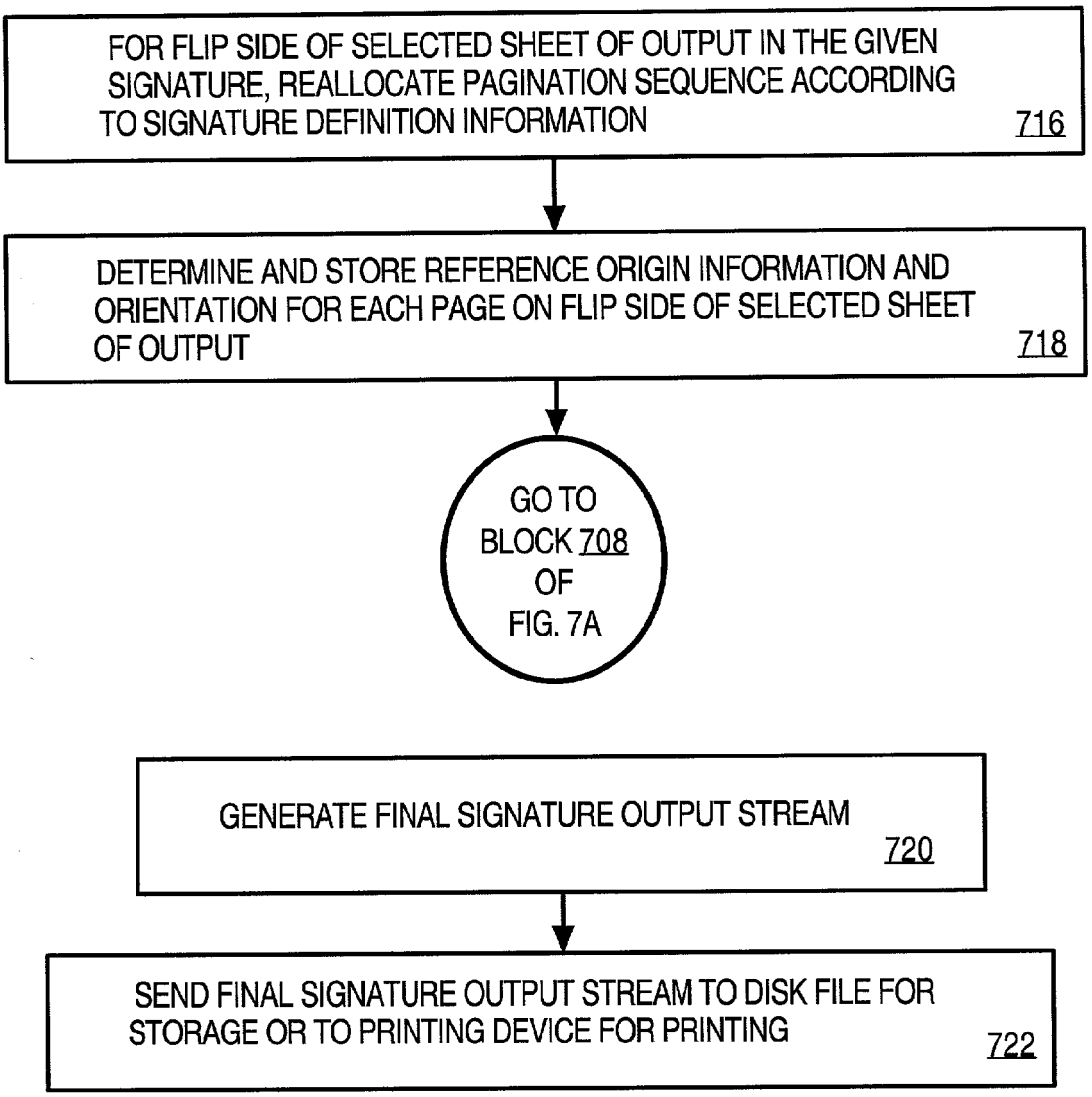

FIG. 7A and FIG. 7B are flowcharts that illustrate the filtering operation performed by the printer driver to produce a final signature output stream that can be understood by the printing device for printing. The filtering operation comprises reallocation of pagination sequence on each side of each sheet of output, determining and storing reference origin information and orientation information for each page on each sheet of output.

In certain embodiments, at block 702, the printer driver reads X, Y and S and the signature definition information from the initial output stream that is referenced in block 516 of FIG. 5.

At block 704, it is determined whether all the signatures that are to be printed are filtered. If it is determined that not all the signatures that are to be printed are filtered, then at block 706, a signature that has not been filtered is selected for filtering. Otherwise, at block 720, the final signature output stream is generated.

At block 708 of FIG. 7A, it is determined whether all the sheets of output of the selected signature are filtered. If it determined that not all the sheets of output of the selected signature are filtered, then at block 710, a sheet of output that has not been filtered is selected. Otherwise, control returns to block 704.

At block 712, the pagination sequence for the front side of the selected sheet of output is reallocated according to the signature definition information read in block 702. At block 714, the reference origin information for each page and orientation information for each page on the front side of the selected sheet of output are determined and stored.

The orientation information of each page is determined from the signature definition information read in block 702. In certain embodiments, the size of each page is scaled based on the size of the print media that is used for printing the sheets of output. If the dimensions of a page is denoted as $D_x$ by $D_y$ and the dimensions of the print media is denoted as $P_x$ by $P_y$, then each page is scaled using scale ratios $r_x$ and $r_y$, where, $r_x = (P_x X):D_x$ $r_y = (P_y Y):D_y$ In FIG. 7B, at block 716, the pagination sequence for the flip side of the selected sheet of output is reallocated according to the signature definition information. At block 718 of FIG. 7B, the reference origin information for each page and orientation information for each page on the flip side of the selected sheet of output are determined and stored. Control then returns to block 708 of FIG. 7A.

When all the sheets of output of each signature have been filtered, then at block 720 of FIG. 7B, a final signature output stream is generated based on the reallocated pagination sequences, reference origin information and orientation information.

At block 722 of FIG. 7B, the final signature output stream is sent to a disk file for storage or to a printing device for printing. The reference origin information gives the location of each page on the sheet of output. The reference origin information for each page is illustrated in Table I below. The origin $O_{i,j}$ coordination formulas for the page $\pi_{i,j}$ are as follows:

$O_{i,j,x} = (P_x/X)*(i-1)$ $O_{i,j,y} = (P_y/Y)*(j-1)$ where i=1, ..., X; j=1, ..., Y.

TABLE I

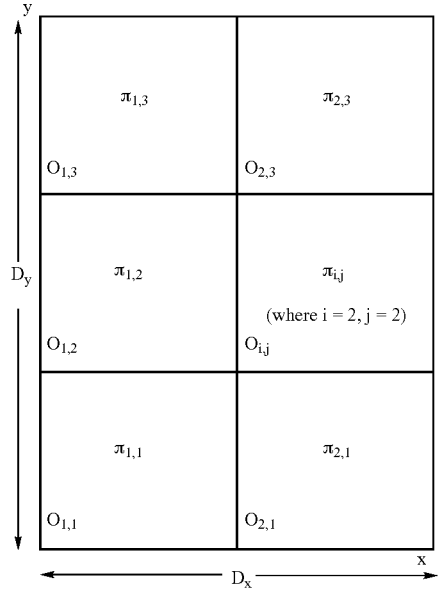

Note: Here X = 2, and Y = 3.

7.0 Implementation Mechanisms

The approach described herein for printing electronic documents may be implemented in a variety of contexts and embodiments and the invention is not limited to any particular context or embodiment. For example, the approach may be integrated into a computer or database system. As another example, the approach may be implemented in any type of device or mechanism configured to perform the approach. The approach may also be implemented in a stand-alone mechanism that interacts with a printing system, device or process. The approach may therefore be implemented in hardware, software, or any combination of hardware and software and the invention is not limited to any particular implementation.

Figure 8:
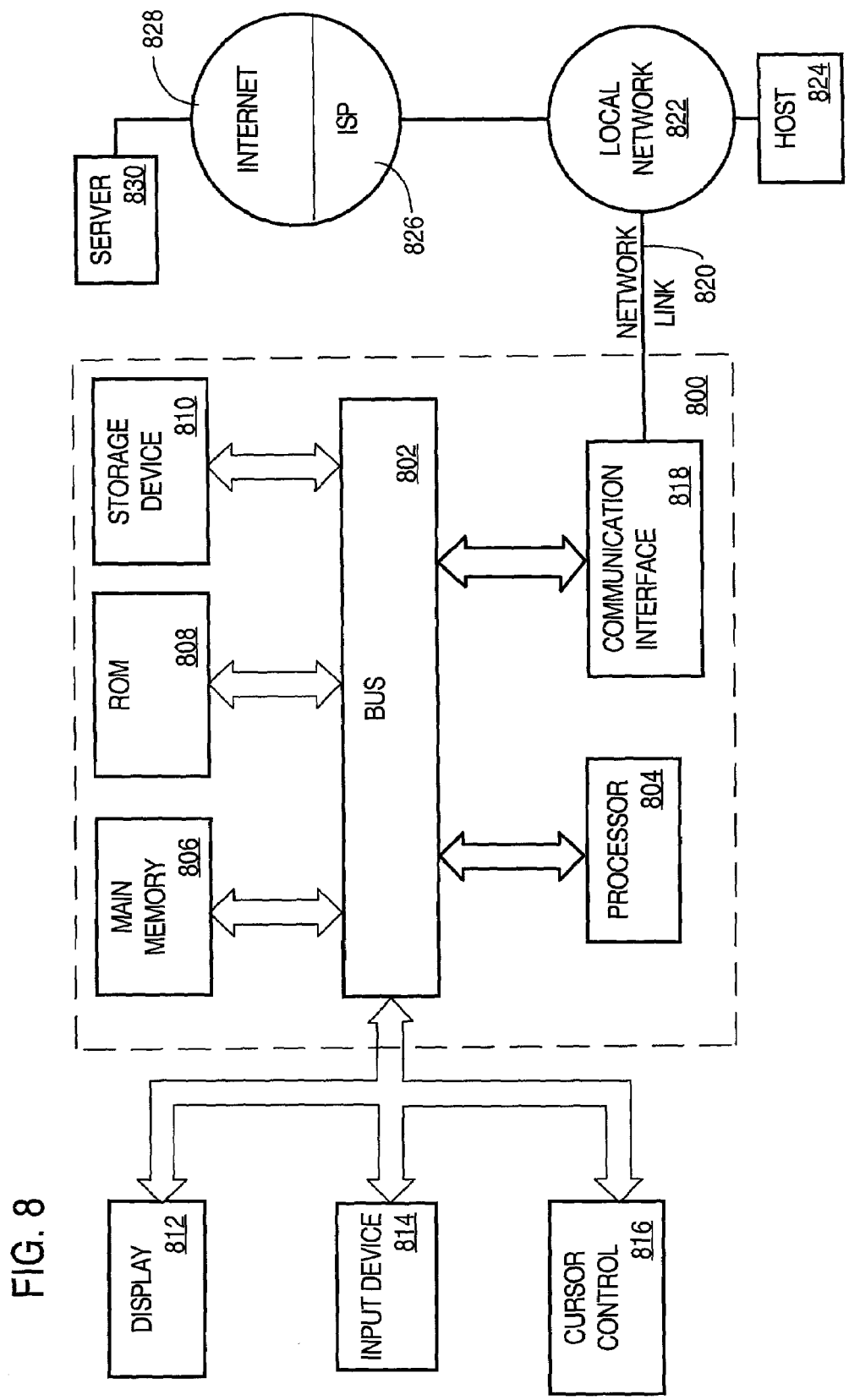
FIG. 8 is a block diagram of a computer system upon which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are implemented by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions.

The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application implements the techniques described herein.

The received code may be executed by processor 804 as it is received, and/or stored in storage device 810, or other non-volatile storage for later execution. In this manner, computer system 800 may obtain application code in the form of a carrier wave.

8.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for printing an electronic document on a plurality of sheets of output, wherein each sheet of output comprises a plurality of pages, the method comprising the computer-implemented steps of:

allowing a user to select from storage a non-default user-created signature definition file that the user created and to which a device driver program does not currently have access;

based on a user selection, the device driver program accessing the selected non-default user-created signature definition file from storage;

determining, based on the selected non-default user-created signature definition file, location information that indicates a location of each page on its corresponding sheet of output;

determining, based on the selected non-default user-created signature definition file, information that indicates an orientation of each page on its corresponding sheet of output;

determining, based on the selected non-default user-created signature definition file, pagination information for each page;

displaying, concurrently for both sides of a sheet of the plurality of sheets of output, an arrangement of pages from the electronic document to be printed on both sides of the sheet, wherein the arrangement of pages is based on the location information, the orientation information and the pagination information; and automatically printing the plurality of sheets of output using the location information, the orientation information and the pagination information.

2. The method as recited in claim 1, wherein the location information of each page, the orientation information of each page, and the pagination information of each page are based on signature definition information from the user-created signature definition file, and wherein a signature comprises a set of one or more sheets of output and pages on each side of each sheet of output are separated from each other by folding lines, and wherein the pages on each sheet of output are arranged so that when the signature is folded along the folding lines, the folded signature has pages in correct orientation and numerical order for printing in book form.

3. The method as recited in claim 1, further comprising printing the electronic document in book form.

4. The method as recited in claim 1, further comprising reading a sheet parameter, wherein the sheet parameter indicates a number of pages to be printed on each side of each sheet of output.

5. The method as recited in claim 1, wherein the step of automatically printing the plurality of sheets of output involves not modifying the electronic document.

6. The method as recited in claim 1, further comprising reading a signature parameter, wherein a signature is a set of one or more sheets of output, and wherein the signature parameter indicates a total number of sheets of output per signature.

7. The method as recited in claim 1, further comprising the step of determining a number of full signatures based on a document parameter, a sheet parameter, and a signature parameter.

8. The method as recited in claim 1, further comprising determining a number of sheets of output that is associated with a residue signature based on a document parameter, a sheet parameter, and a signature parameter.

9. The method as recited in claim 1, further comprising selecting signature definition information from the user-created signature definition file based on:
a number of pages to be printed on each side of each sheet of output; and
a total number of sheets of output per signature.

10. The method as recited in claim 9, wherein the signature definition information comprises:
information relating to the number of pages to be printed on each side of each sheet of output;
information relating to the total number of sheets of output per signature;
information relating to the orientation information of each page of the electronic document; and
information relating to the pagination information of each page of the electronic document.

11. The method as recited in claim 1, wherein the step of determining location information is based on:
a sheet parameter, wherein the sheet parameter indicates a number of pages to be printed on each side of each sheet of output; and
a paper size information that is associated with each sheet of output.

12. The method as recited in claim 1, wherein the step of determining orientation information is based on:
a sheet parameter, wherein the sheet parameter indicates a number of pages to be printed on each side of each sheet of output; and
a signature parameter, wherein the signature parameter indicates a total number of sheets output per signature.

13. The method as recited in claim 1, further comprising the step of:
for each sheet of output of the plurality of sheets of output determining an Nth pagination information for an Nth signature is based on:
a first pagination information that is associated with a first signature;
a signature parameter, wherein the signature parameter indicates a total number of sheets output per signature; and
a sheet parameter, wherein the sheet parameter indicates a number of pages to be printed on each side of each sheet of output.

14. The method as recited in claim 1, further comprising the steps of:
using an output device for printing each sheet of output;
controlling the output device by using the device driver program; and
generating, using the device driver program, instructions that carry out the steps of determining the location information, the orientation information, the pagination information; and
generating, using the device driver program, instructions that carry out the step of automatically printing each sheet of output using the location information, the orientation information and the pagination information without modifying the electronic document.

15. The method as recited in claim 14, further comprising the step of:
generating, using the device driver program, instructions that cause a graphical user interface to display book printing features that comprises:
a signature layout feature;
a signature definition file feature that allows a user to select from storage the user's own non-default signature definition file to which the device driver program does not currently have access;
an automatic signature definition selection feature that allows the user to select a default signature definition file associated with the device driver program;
a signature parameter that indicates a total number of sheets of output per signature; and
a sheet parameter feature that indicates a number of pages to be printed on each side of each sheet of output.

16. The method as recited in claim 1, further comprising the steps of:

using an output device for printing each sheet of output;
controlling the output device by using a device driver program for:
generating an initial output stream that comprises information on:
a number of pages per side of each sheet of output;
a number of sheets of output per signature;
a signature definition information;
filtering each sheet of output of each signature based on the initial output stream by performing the steps of:
for each side of each sheet of output, reallocating a pagination sequence according to the signature definition information;
arranging each page using the location information and orientation information of each page; and
after filtering each sheet of output, generating a final signature output stream that comprises information on each sheet of output that has been filtered.

17. A method for making a book from an electronic document, the method comprising the computer implemented steps of:
allowing a user to select from storage one or more non-default user-created signature definition file that the user created and to which a device driver program does not currently have access;
based on a user selection, the device driver program accessing the selected non-default one or more user-created signature definition files from storage;
printing the electronic document on a plurality of sheets of output, wherein each sheet of output comprises a plurality of pages;
determining, based on the selected non-default one or more user-created signature definition files, a set of one or more signatures that is associated with the book;
determining location information that indicates a location of each page on its corresponding sheet of output;
determining orientation information that indicates an orientation of each page on its corresponding sheet of output;
determining pagination information for each page;
displaying, concurrently for both sides of a sheet of the plurality of sheets of output, an arrangement of pages from the electronic document to be printed on both sides of the sheet, wherein the arrangement of pages is based on the location information, the orientation information and the pagination information;
automatically printing the plurality of sheets of output within each signature using the location information, the orientation information, and the pagination information;
folding each signature from the set of signatures to form a set of folded signatures; and
collating and binding the set of folded signatures to form the book.

18. A method for printing an electronic document to form a book, the method comprising the computer implemented steps of:
allowing a user to select from storage a non-default user-created signature definition file that the user created and to which a device driver program does not currently have access;
based on a user selection, the device driver program accessing the selected non-default user-created signature definition file from storage;
reading a document parameter wherein the document parameter indicates a total number of pages of the book;
reading a sheet parameter, wherein the sheet parameter indicates a number of pages to be printed on each side of a sheet of output;
reading a signature parameter, wherein the signature parameter indicates a total number of sheets of output per signature;
determining a number of full signatures based on the document parameter, the sheet parameter and the signature parameter;
determining a number of sheets of output for a residue signature based on the document parameter, the sheet parameter, and the signature parameter;
using a signature definition information based on the sheet parameter and the signature parameter;
for each sheet of output in the signature, determining:
location information of each page;
orientation information of each page; and
pagination information;
displaying, concurrently for both sides of a sheet of output, an arrangement of pages from the electronic document to be printed on both sides of the sheet, wherein the arrangement of pages is based on the location information, the orientation information and the pagination information; and
automatically printing each sheet of output of each signature of the one or more signatures using the location information, the orientation information and the pagination information.

19. A computer-readable medium carrying one or more sequences of instructions for printing an electronic document, on a plurality of sheets of output, wherein each sheet of output comprises a plurality of pages, and wherein execution of the one or more sequences of instructions by one or more processors causes the one or more processors to perform the steps of:
allowing a user to select from storage a non-default user-created signature definition file that the user created and to which a device driver program does not currently have access;
based on a user selection, the device driver program accessing the selected non-default user-created signature definition file from storage;
determining, based on the selected non-default user-created signature definition file, location information that indicates a location of each page on its corresponding sheet of output;
determining, based on the selected non-default user-created signature definition file, information that indicates an orientation of each page on its corresponding sheet of output;
determining, based on the selected non-default user-created signature definition file, pagination information for each page;
displaying, concurrently for both sides of a sheet of the plurality of sheets of output, an arrangement of pages from the electronic document to be printed on both sides of the sheet, wherein the arrangement of pages is based on the location information, the orientation information and the pagination information; and
automatically printing the plurality of sheets of output using the location information, the orientation information and the pagination information.

20. The computer-readable medium as recited in claim 19, wherein the location information of each page, the orientation information of each page, and the pagination information of each page are based on signature definition information from the user-created signature definition file, and wherein a signature comprises a set of one or more sheets of output and pages on each side of each sheet of output are separated from each other by folding lines, and wherein the pages on each sheet of output are arranged so that when the signature is folded along the folding lines, the folded signature has pages in correct orientation and numerical order for printing in book form.

21. The computer-readable medium as recited in claim 19, further comprising printing the electronic document in book form.

22. The computer-readable medium as recited in claim 19, further comprising reading a sheet parameter, wherein the sheet parameter indicates a number of pages to be printed on each side of each sheet of output.

23. The computer-readable medium as recited in claim 19, wherein the step of automatically printing the plurality of sheets of output involves not modifying the electronic document.

24. The computer-readable medium as recited in claim 19, further comprising reading a signature parameter, wherein a signature is a set of one or more sheets of output, and wherein the signature parameter indicates a total number of sheets of output per signature.

25. The computer-readable medium as recited in claim 19, further comprising the step of determining a number of full signatures based on a document parameter, a sheet parameter, and a signature parameter.

26. The computer-readable medium as recited in claim 19, further comprising determining a number of sheets of output that is associated with a residue signature based on a document parameter, a sheet parameter, and a signature parameter.

27. The computer-readable medium as recited in claim 19, further comprising selecting signature definition information from the user-created signature definition file based on:
   a number of pages to be printed on each side of each sheet of output; and
   a total number of sheets of output per signature.

28. The computer-readable medium as recited in claim 27, wherein the signature definition information comprises:
   information relating to the number of pages to be printed on each side of each sheet of output;
   information relating to the total number of sheets of output per signature;
   information relating to the orientation information of each page of the electronic document; and
   information relating to the pagination information of each page of the electronic document.

29. The computer-readable medium as recited in claim 19, wherein the step of determining location information is based on:
   a sheet parameter, wherein the sheet parameter indicates a number of pages to be printed on each side of each sheet of output; and
   a paper size information that is associated with each sheet of output.

30. The computer-readable medium as recited in claim 19, wherein the step of determining orientation information is based on:
   a sheet parameter, wherein the sheet parameter indicates a number of pages to be printed on each side of each sheet of output; and
   a signature parameter, wherein the signature parameter indicates a total number of sheets output per signature.

31. The computer-readable medium as recited in claim 19, further comprising the step of:
   for each sheet of output of the plurality of sheets of output determining an Nth pagination information for an Nth signature is based on:
      a first pagination information that is associated with a first signature;
      a signature parameter, wherein the signature parameter indicates a total number of sheets output per signature; and
      a sheet parameter, wherein the sheet parameter indicates a number of pages to be printed on each side of each sheet of output.

32. The computer-readable medium as recited in claim 19, further comprising the steps of:
   using an output device for printing each sheet of output;
   controlling the output device by using the device driver program; and
   generating, using the device driver program, instructions that carry out the step of determining the location information, the orientation information, the pagination information; and
   generating, using the device driver program, instructions that carry out the step of automatically printing each sheet of output using the location information, the orientation information and the pagination information without modifying the electronic document.

33. The computer-readable medium as recited in claim 32, further comprising the step of:
   generating, using the device driver program, instructions that cause a graphical user interface to display book printing features that comprises:
      a signature layout feature;
      a signature definition file feature that allows a user to select from storage the user's own non-default signature definition file to which the device driver program does not currently have access;
      an automatic signature definition selection feature that allows the user to select a default signature definition file associated with the device driver program;
      a signature parameter that indicates a total number of sheets of output per signature; and
      a sheet parameter feature that indicates a number of pages to be printed on each side of each sheet of output.

34. The computer-readable medium as recited in claim 19, further comprising the steps of:
   using an output device for printing each sheet of output;
   controlling the output device by using a device driver program for:
      generating an initial output stream that comprises information on:
         a number of pages per side of each sheet of output;
         a number of sheets of output per signature;
         a signature definition information;
      filtering each sheet of output of each signature based on the initial output stream by performing the steps of:
         for each side of each sheet of output, reallocating a pagination sequence according to the signature definition information;
         arranging each page using the location information and orientation information of each page; and
      after filtering each sheet of output, generating a final signature output stream that comprises information on each sheet of output that has been filtered.

35. An apparatus for printing electronic documents comprising:
   an interface configured to receive an electronic document; and a printing mechanism communicatively coupled to the interface and configured to print the electronic document on a plurality of sheets of output, wherein each sheet of output comprises a plurality of pages by:
    allowing a user to select from storage a non-default user-created signature definition file that the user created and to which a device driver program does not currently have access;
    based on a user selection, the device driver program accessing the selected non-default user-created signature definition file from storage;
    determining, from the selected non-default user-created signature definition file, location information that indicates a location of each page on its corresponding sheet of output;
    determining, from the selected non-default user-created signature definition file, orientation information that indicates an orientation of each page on its corresponding sheet of output, wherein the orientation information indicates that at least two vertically adjacent pages on a side of a corresponding sheet are oriented in opposing directions;
    determining, from the selected non-default user-created signature definition file, pagination information for each page;
    displaying, concurrently for both sides of a sheet of the plurality of sheets of output, an arrangement of pages from the electronic document to be printed on both sides of the sheet, wherein the arrangement of pages is based on the location information, the orientation information and the pagination information; and
    automatically printing the plurality of sheets of output using the location information, the orientation information and the pagination information.

36. The apparatus as recited in claim 35, wherein the location information of each page, the orientation information of each page, and the pagination information of each page are based on signature definition information from the user-created signature definition file, and wherein a signature comprises a set of one or more sheets of output and pages on each side of each sheet of output are separated from each other by folding lines, and wherein the pages on each sheet of output are arranged so that when the signature is folded along the folding lines, the folded signature has pages in correct orientation and numerical order for printing in book form.

37. The apparatus as recited in claim 35, wherein the printing mechanism is further configured to print the electronic document in book form.

38. The apparatus as recited in claim 35, wherein the printing mechanism is further configured to read a sheet parameter, and wherein the sheet parameter indicates a number of pages to be printed on each side of each sheet of output.

39. The apparatus as recited in claim 35, wherein the step of automatically printing the plurality of sheets of output involves not modifying the electronic document.

40. The apparatus as recited in claim 35, wherein the printing mechanism is further configured to read a signature parameter, and wherein a signature is a set of one or more sheets of output, and wherein the signature parameter indicates a total number of sheets of output per signature.

41. The apparatus as recited in claim 35, wherein the printing mechanism is further configured to determine a number of full signatures based on a document parameter, a sheet parameter, and a signature parameter.

42. The apparatus as recited in claim 35, wherein the printing mechanism is further configured to determine a number of sheets of output that is associated with a residue signature based on a document parameter, a sheet parameter, and a signature parameter.

43. The apparatus as recited in claim 35, wherein the printing mechanism is further configured to select a signature definition information from the user-created signature definition file based on:
    a number of pages to be printed on each side of each sheet of output; and
    a total number of sheets of output per signature.

44. The apparatus as recited in claim 43, wherein the signature definition information comprises:
    information relating to the number of pages to be printed on each side of each sheet of output;
    information relating to the total number of sheets of output per signature;
    information relating to the orientation information of each page of the electronic document; and
    information relating to the pagination information of each page of the electronic document.

45. The apparatus as recited in claim 35, wherein the step of determining location information is based on:
    a sheet parameter, wherein the sheet parameter indicates a number of pages to be printed on each side of each sheet of output; and
    a paper size information that is associated with each sheet of output.

46. The apparatus as recited in claim 35, wherein the step of determining orientation information is based on:
    a sheet parameter, wherein the sheet parameter indicates a number of pages to be printed on each side of each sheet of output; and
    a signature parameter, wherein the signature parameter indicates a total number of sheets output per signature.

47. The apparatus as recited in claim 35, wherein the printing mechanism is further configured to:
    for each sheet of output of the plurality of sheets of output determine an Nth pagination information for an Nth signature is based on:
        a first pagination information that is associated with a first signature;
        a signature parameter, wherein the signature parameter indicates a total number of sheets output per signature; and
        a sheet parameter, wherein the sheet parameter indicates a number of pages to be printed on each side of each sheet of output.

48. The apparatus as recited in claim 35, wherein the printing mechanism is further configured to:
    use an output device for printing each sheet of output;
    control the output device by using the device driver program; and
    generate, using the device driver program, instructions that carry out the step of determining the location information, the orientation information, the pagination information; and
    generate, using the device driver program, instructions that carry out the step of automatically printing each sheet of output using the location information, the orientation information and the pagination information without modifying the electronic document.

49. The apparatus as recited in claim 48, wherein the printing mechanism is further configured to:

generate, using the device driver program, instructions that cause a graphical user interface to display book printing features that comprises:
  a signature layout feature;
  a signature definition file feature that allows a user to select from storage the user's own non-default signature definition file to which the device driver program does not currently have access;
  an automatic signature definition selection feature that allows the user to select a default signature definition file associated with the device driver program;
  a signature parameter that indicates a total number of sheets of output per signature; and
  a sheet parameter feature that indicates a number of pages to be printed on each side of each sheet of output.

50. The apparatus as recited in claim 35, wherein the printing mechanism is further configured to:
  use an output device for printing each sheet of output;
  control the output device by using a device driver program for:
    generating an initial output stream that comprises information on:
      a number of pages per side of each sheet of output;
      a number of sheets of output per signature;
      a signature definition information;
    filtering each sheet of output of each signature based on the initial output stream by performing the steps of:
      for each side of each sheet of output, reallocating a pagination sequence according to the signature definition information;
      arranging each page using the location information and orientation information of each page; and
    after filtering each sheet of output, generating a final signature output stream that comprises information on each sheet of output that has been filtered.

51. The method as recited in claim 11, comprising:
  scaling the size of each page of the plurality of pages based in part on the paper size information.

* * * * *

UNITED STATES PATENT AND TRADEMARK OFFICE
CERTIFICATE OF CORRECTION

PATENT NO. : 7,180,608 B1  
APPLICATION NO. : 09/967722  
DATED : February 20, 2007  
INVENTOR(S) : Zhongming Yu It is certified that error appears in the above-identified patent and that said Letters Patent is hereby corrected as shown below:

On the Title page of U.S. Patent 7,180,608 B1

Section (73) Assignee:

Replace "Riooh Company, Ltd." with -- 'Ricoh Company, Ltd.' --

Signed and Sealed this

Twentieth Day of May, 2008

JON W. DUDAS  
*Director of the United States Patent and Trademark Office*